Aug. 16, 1932.  G. E. MELLGREN ET AL  1,872,162
MEANS FOR MANUFACTURING MATCH BOXES
Filed Nov. 7, 1928   6 Sheets-Sheet 1
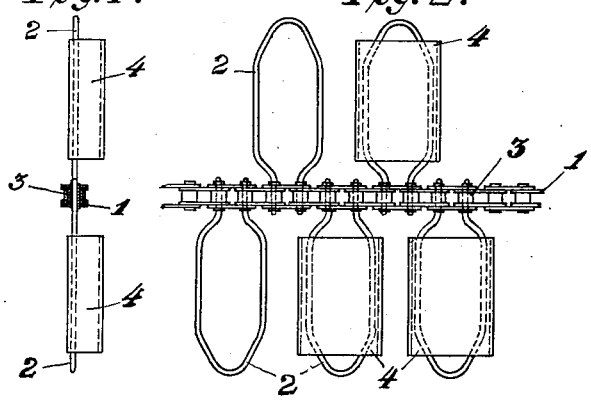
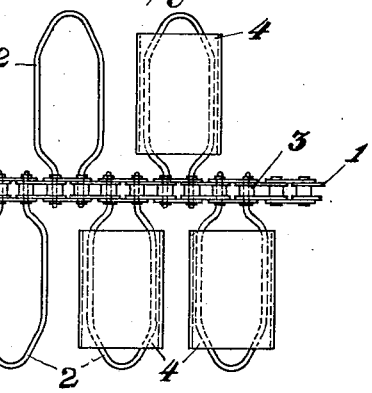
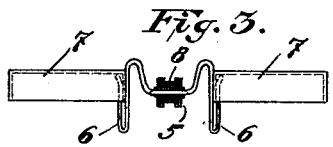
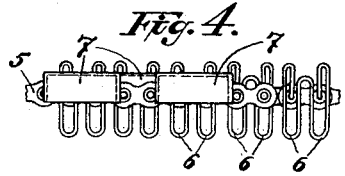
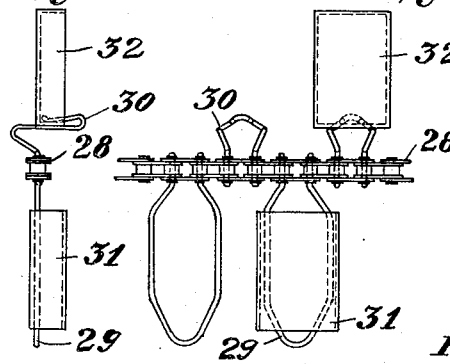
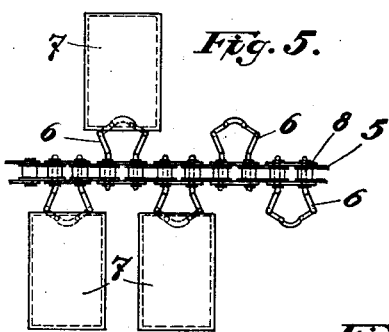
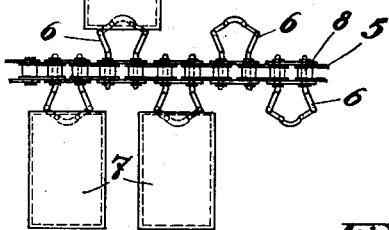
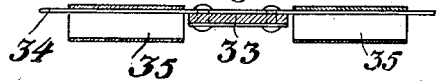
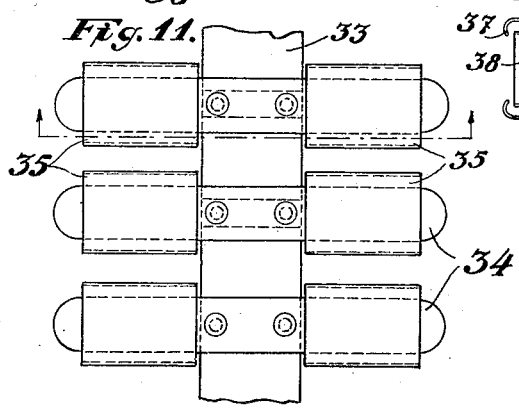
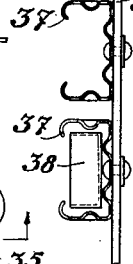
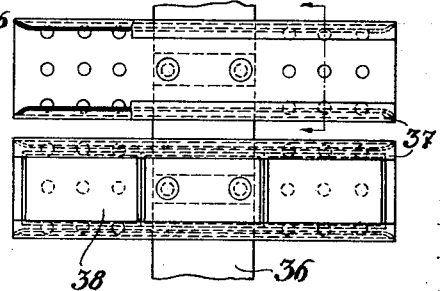
Inventors:
John Gotthard Sjöström
Gunnar Emanuel Mellgren
Anders Roland Swälas
Gustaf Vilhelm Hedin
by George Boyard Jones
Attorney

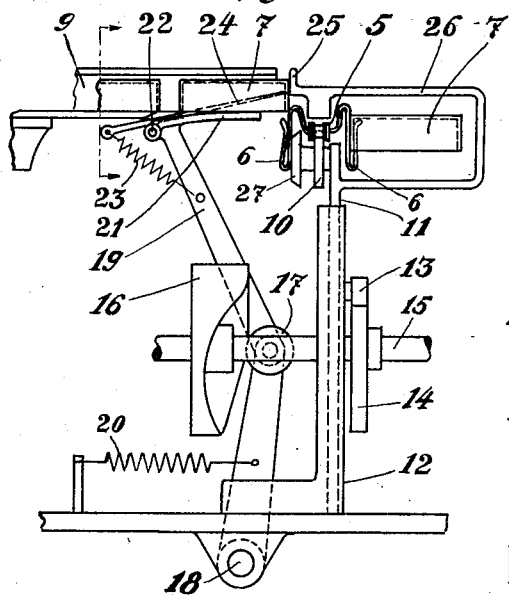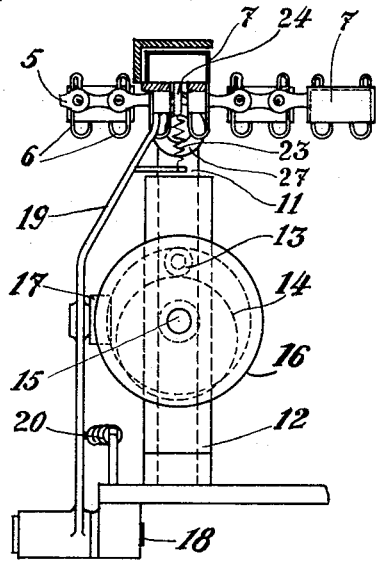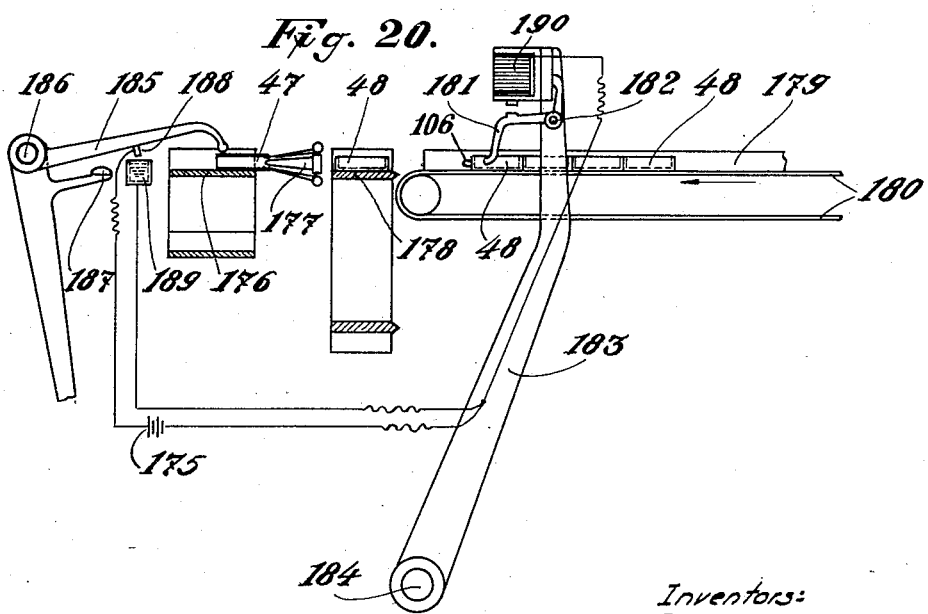

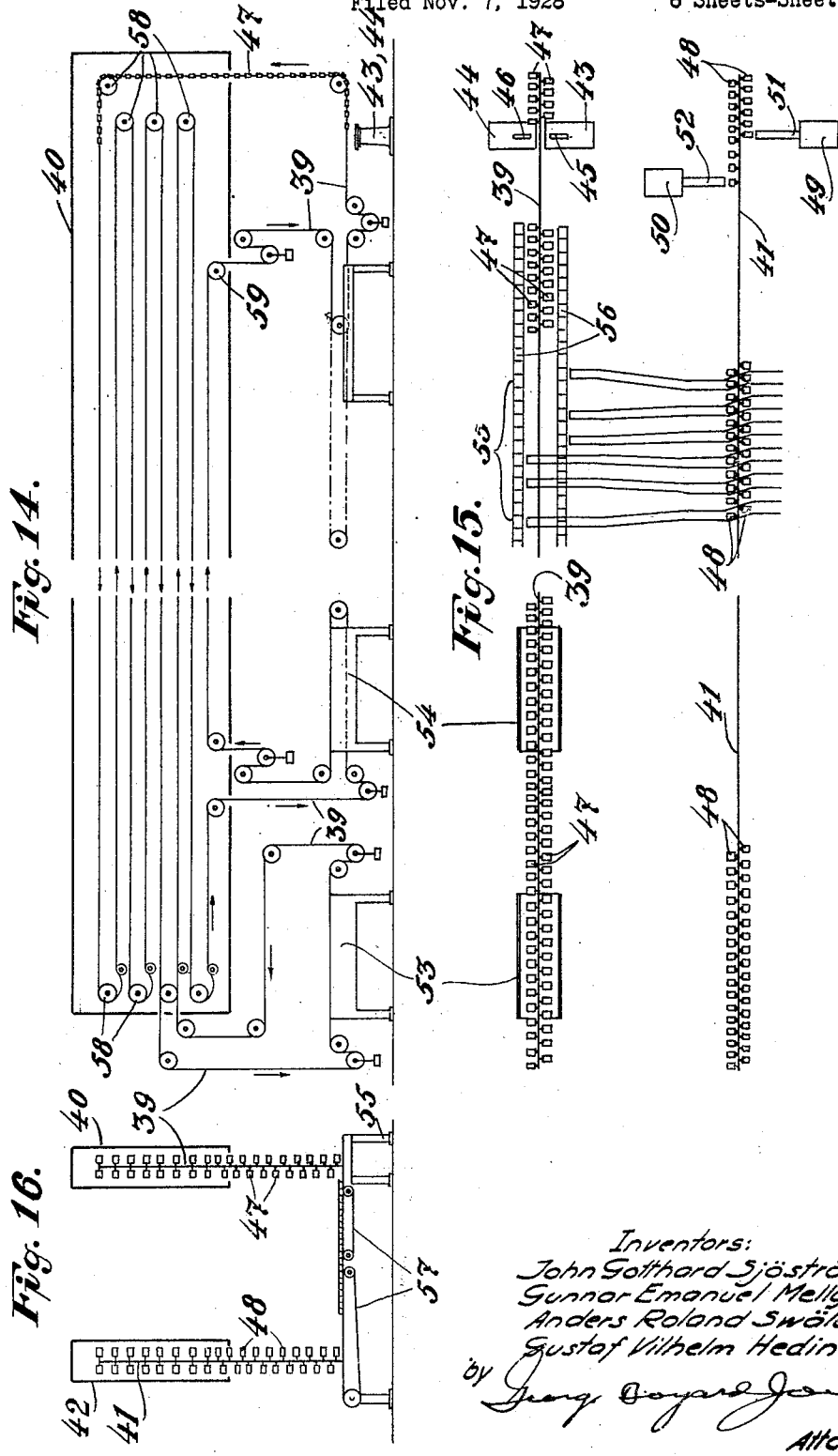

Aug. 16, 1932.  G. E. MELLGREN ET AL  1,872,162
MEANS FOR MANUFACTURING MATCH BOXES
Filed Nov. 7, 1928   6 Sheets-Sheet 4
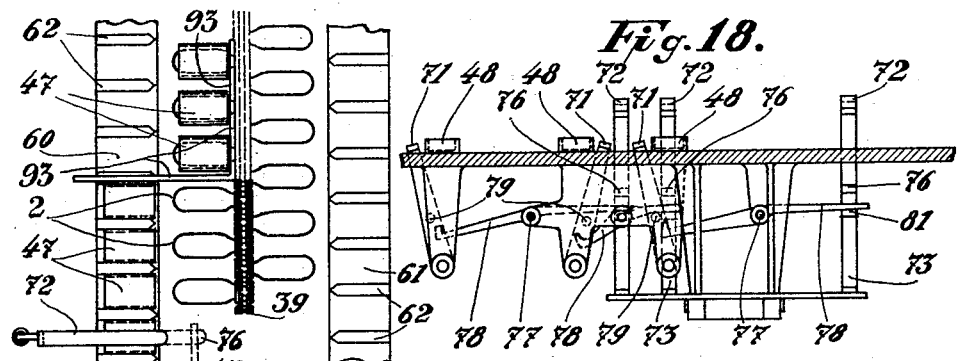
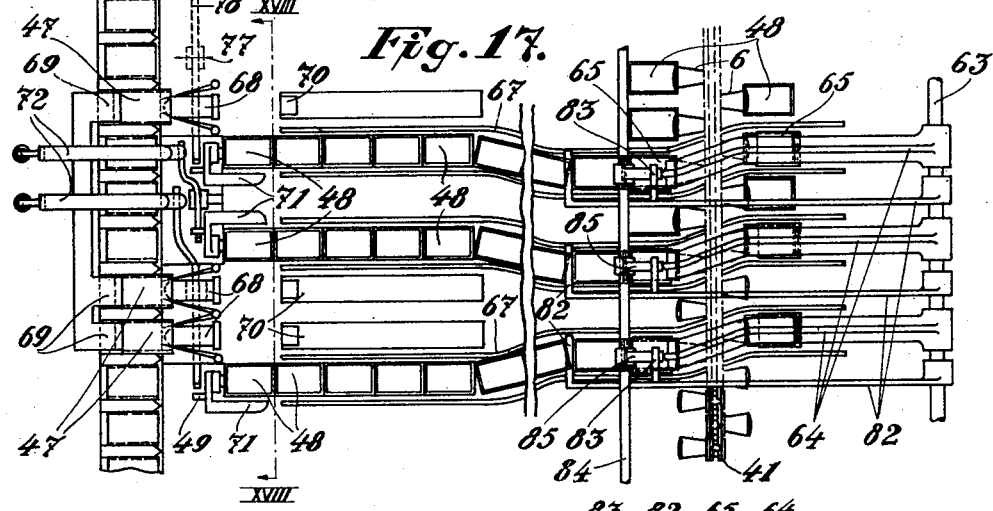
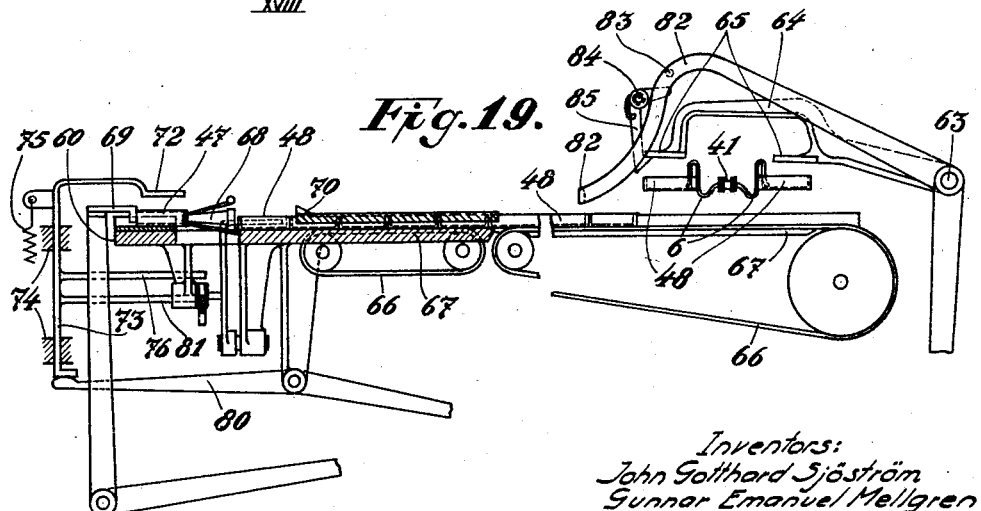

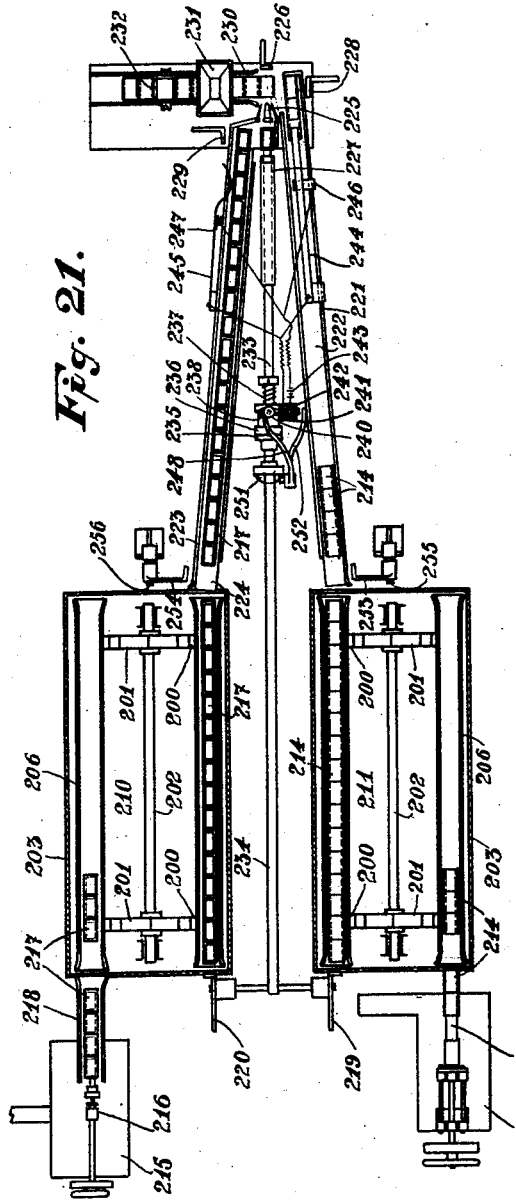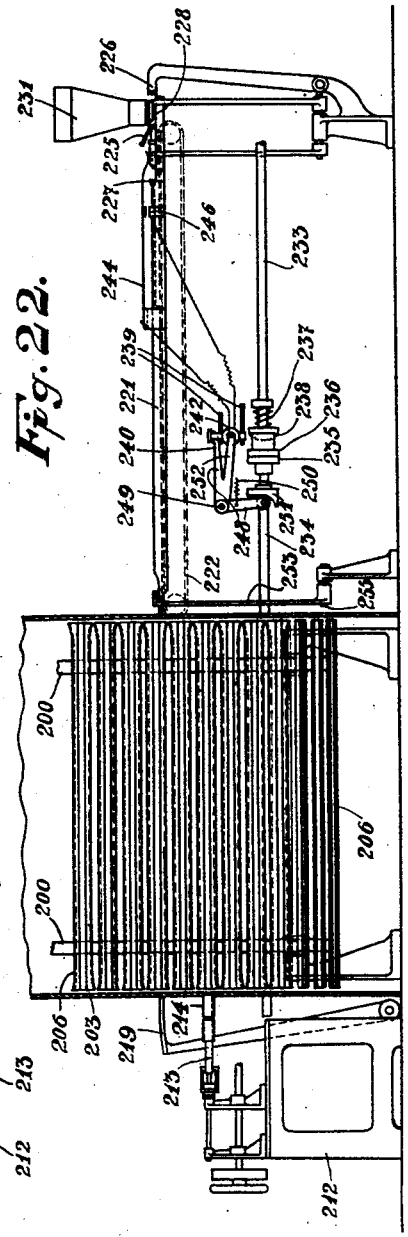

Aug. 16, 1932.  G. E. MELLGREN ET AL  1,872,162
MEANS FOR MANUFACTURING MATCH BOXES
Filed Nov. 7, 1928  6 Sheets-Sheet 6
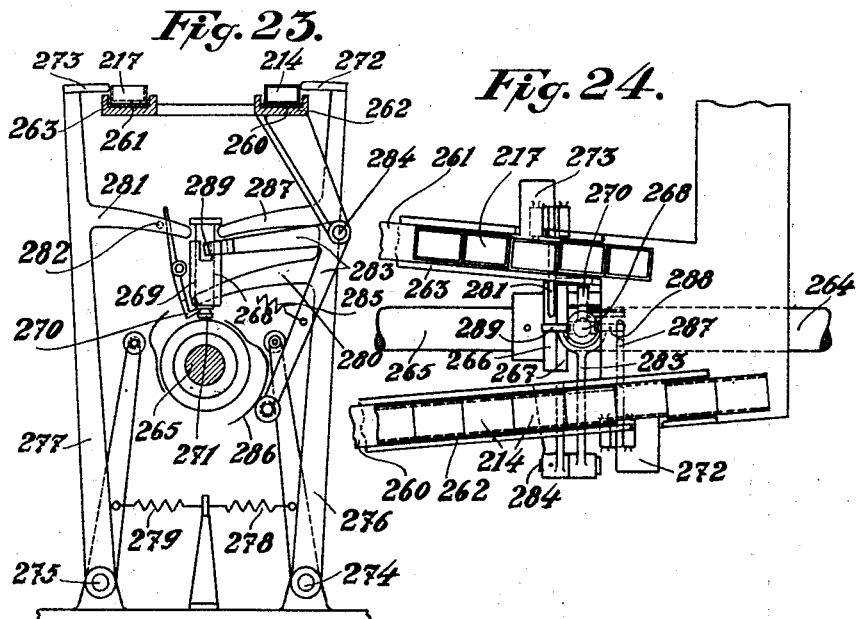
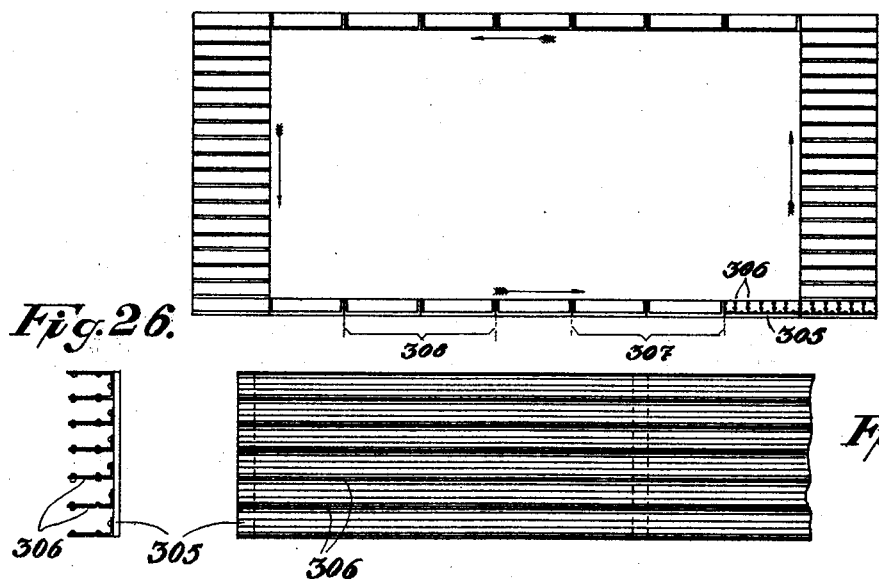
Inventors:
John Gotthard Sjöström
Gunnar Emanuel Mellgren
Anders Roland Swålos
Gustaf Vilhelm Hedin
by
Attorney Patented Aug. 16, 1932

1,872,162

UNITED STATES PATENT OFFICE

GUNNAR EMANUEL MELLGREN, OF TIDAHOLM, AND JOHN GOTTHARD SJÖSTRÖM, OF JONKOPING, AND ANDERS ROLAND SWÄLAS AND GUSTAF VILHELM HEDIN, OF TIDAHOLM, SWEDEN

MEANS FOR MANUFACTURING MATCH BOXES

Application filed November 7, 1928. Serial No. 317,792.

The present invention relates to the manufacture of such match boxes (outer and inner boxes) which consist of a thin wooden veneer which is surrounded and held together by a paper pasted thereto. Heretofore, the manufacture of such boxes has as a rule been performed in such manner that the veneer and the pasted paper are together wound up on rotary or, in some cases, stationary pistons from which the completed boxes are then stripped off by means of suitable stripping members to be collected in disorder in receptacles or on belt conveyers. By means of these the boxes are introduced, still in disorder, in a dryer in which they are subjected during a longer or shorter time to the influence of hot air for the purpose of drying the boxes. After the drying has been completed the inner boxes are to be pushed into the outer boxes, and these latter are to be provided with labels, which has been performed in special box-closing and labelling machines. In these machines the inner boxes as well as the outer boxes must be introduced in order and in predetermined positions, in order to render possible the closing and labelling of the boxes. This ordering, or so-called turning right and arranging of the boxes, has hitherto in practice been effected exclusively by hand, and has therefore been a very time-wasting and expensive operation, which has taken a very considerable portion of the cost of production of the boxes. Automatically operating so-called turning-right and box-closing machines have been constructed but none of these proposed constructions has so far gained any practical use for the reason that they have not operated in a reliable manner.

It is an object of the present invention to eliminate the time-wasting and costly manual labour above referred to. Principally, the invention resides in the combination of a machine for making wooden veneer match box portions—inners and/or outers—a dryer, a box-closing machine, and a conveyer adapted to convey the box portions from the box-making machine through the dryer to the box-closing machine while maintaining the box portions in predetermined arrangement during such conveyance. The box portions are thus maintained in arranged determined positions from the time they are produced in the box-making machines until they are supplied to the box-closing machines, as a result of which the special operation of turning the box portions right, heretofore necessary, while supplying the same to the box-closing machine, is avoided. Owing to the box portions being thus maintained in determined positions during their entire movement, the very great advantage is attained, in the first place, that the box portions which are still moist and therefore not very strong, will not be deformed during the drying, and in the second place, it also becomes possible to provide the outer box portions with labels during the drying, before the box portions are supplied to the box-closing machine. In this manner a saving of time is obtained, and the advantage is also attained that also the labels get time to dry during the remaining portion of the movement of the box portions through the dryer.

The conveyor may consist of an endless chain or chains, a belt, or the like, which, guided in a suitable manner, conveys the box portions from the box-making machine through the dryer to the box-closing machine, and which is provided with guide members serving to guide the box portions, and which are arranged or shaped in such manner that they maintain the box portions in determined positions. In the case of outer boxes—box casings—said last-mentioned members may simply consist, for instance, of straps, arms, or the like, on to which the outer boxes are pushed from the winding piston of the outer box-making machine, while in the case of inner boxes said members may suitably consist of spring holders or the like which are so shaped as to grip around one of the sides, for instance one of the short sides, of the inner box and thus retain the boxes in the determined position, or they may consist of suitably shaped chutes or the like which surround the boxes so as to retain the same in their positions, but still give the drying air access to flow around the boxes. Finally, the invention also contemplates means for transferring the boxes from the box-making machine to the conveyers, means for transferring the boxes from the conveyers to the box-closing machine in such manner that also during such transfer the boxes always retain their predetermined positions, and means for controlling the supply of inner and outer boxes to the box-closing machine.

In the accompanying drawings a few embodiments of such means for carrying out the new method are illustrated by way of example.

Figs. 1 and 2 show, in cross section and in plan view, respectively, an embodiment of the conveyer with holders for carrying outer boxes.

Figs. 3 to 5 show, in cross section, in side elevation, and in plan view, respectively, an embodiment of the conveyer with holders for carrying inner boxes.

Figs. 6 and 7 show an embodiment of the means for transferring the inner boxes from the inner box-making machine to the conveyer illustrated in Figs. 3 to 5, viewed from two different sides and partly in section.

Figs. 8 and 9 show, in cross section and in plan view, respectively, an embodiment of the conveyer which is provided with holders for receiving outer boxes as well as with holders for receiving inner boxes.

Figs. 10 and 11 show a further embodiment of the conveyer with holders for receiving outer boxes.

Figs. 12 and 13 show a constructional form of the conveyer with holders arranged in such manner that they are capable of receiving outer boxes as well as inner boxes.

Figs. 14, 15 and 16 show, in side elevation, in plan view, and in cross section, respectively, a diagrammatic assembled view of the machines of an aggregate with two dryers—for the outer and inner boxes—and the necessary conveyers.

Fig. 17 shows a constructional form of the means for transferring the outer and inner boxes from their conveyers to the box-closing machine, viewed from above, Fig. 18 shows a section on the line XVIII—XVIII in Fig. 17, and Fig. 19 shows the same means viewed from below in Fig. 17.

Fig. 20 shows a modified means for controlling the supply of boxes to the box-closing machine.

Figs. 21 and 22 show a further constructional form of the conveyer for conveying the boxes through the dryer, and a means for transferring the boxes to and from conveyers of this type.

Figs. 23 and 24 show a means for stopping the box-closing machine if for some reason the supply of outer boxes or inner boxes to the same ceases.

Figs. 25 to 27 show a further constructional form of the conveyer for conveying the boxes through the dryer.

The conveyer illustrated in Figs. 1 and 2 and which is intended solely for supporting outer boxes, consists of a link chain 1, for instance of the type used for bicycles, which supports two rows of metal wire straps 2, one row on each side. For this purpose the roller pins 3 of the chain are provided with central through holes in which the ends of the strap shanks are inserted and secured in suitable manner. In the instance illustrated, each strap 2 is intended to receive only one outer box 4, the length of the straps being dimensioned accordingly, but it will be evident that the straps may also be made longer so that each strap can receive two or more outer boxes, one after the other. The outer width $a$ of the straps is so chosen that it is slightly less than the inside width of the outer box, but greater than the inside height of the same. Consequently it is not possible for the box to turn around when once pushed on to the strap, and during the movement of the chain the box will always be maintained in a definite position relatively to the adjacent portion of the conveyer chain. In operation the conveyer constructed in this manner is caused to move step by step or continuously past the winding pistons of two outer box-making machines placed one on each side of the chain, and to stop during a short moment each time a strap on the chain arrives in front of one of said pistons, during which moment the box made on the piston is pushed over on to the strap 2 by means of the usual stripping off member.

In Figs. 3 to 5 a corresponding conveyer for supporting inner boxes, is shown. This conveyer consists likewise of a link chain 5 of the cycle chain type, which supports two rows of spring holders 6 which are shaped in such manner as to be capable of gripping around one short side of the inner boxes 7, thus holding said boxes in the determined position. In the instance illustrated, said spring holders consist of twice bent metal wire straps, the ends of the shanks of which are attached to the roller pins 8 of the chain, but it will be understood that said holders may also be made in any other suitable manner.

The transferring of the inner boxes 7 to this conveyer may suitably be effected by means of the apparatus illustrated in Figs. 6 and 7. The inner boxes are presumed to be made by means of an inner box-making machine of the type described in U. S. Patent No. 1,765,767, dated June 24, 1930, or more suitably two such machines, the inner boxes made in the one machine being transferred to the spring holders 6 on one side of the conveyer chain 5, and the boxes made in the other machine being transferred to the spring holders 6 on the other side of the conveyer chain. The above-mentioned inner box-making machine delivers the boxes 7, lying in a row one after the other with the bottoms turned upwards, into a feed chute 9 past the open end of which the conveyer chain 5 is caused to move step by step or continuously.

The chain 5 is guided by a roller or a sprocket wheel 10 which is rotatably journalled in a slide 11, which is movable up and down in a stationary guide 12 and is supported by a roller 13 which rests on a cam disk 14 mounted on the shaft 15, which is journalled in the machine frame. Likewise mounted on said shaft is a cam disk 16 which actuates a roller 17 on a lever 19 pivoted on the pin 18, said lever being actuated by a spring 20 which maintains the roller 17 bearing against said cam disk. The lever 19 supports at its upper end a supporting plate 21 for the outermost box 7, and also a feed tongue 24 which is pivoted on the pin 22 and actuated by the spring 23, and which is adapted to enter the outermost box 7 from below and push said box forward into contact with a stop 25 at the outer end of a yoke 26 secured to the slide 11. Journalled on the shaft of the sprocket wheel 10 is a roller 27 which is adapted to serve as a support for the spring holders 6, when the boxes are to be pushed down into said holders. The shaft 15 shall be geared to the driving device for the conveyer chain 5 in such manner that said shaft makes one revolution while the conveyer chain moves a distance corresponding to the distance between two adjacent spring holders 6 on the same side of the conveyer chain.

The boxes are being secured in the spring holders 6 in the following manner: When the outermost box 7 in the chute 9 has been pushed by the tongue 24 forward to the position shown in Fig. 6, in which the forward short side of the box bears against the stop 25, which latter has such position that the said short side of the box is then approximately right above the holder 6 in which it is to be secured, the slide 11 is moved upwards by the influence of the cam disk 14 and carries along the conveyer chain and the spring holders. Since, as will be seen in Fig. 6, the box has support against the upper wall of the chute 9, the forward short side of the box 7 will be pressed into the spring holder 6. Simultaneously, the lever 19 with the supporting plate 21 and the tongue 24 is rapidly returned to the left in Fig. 6, so that the inner box attached to the spring holder may move downwards when now the slide 11 and the members supported by the same move downwards again. As soon as in this manner the box has come below the chute 9, it is unprevented from following the conveyer chain 5 during its continued movement. The course described is repeated as soon as the next spring holder 6 on the same side—the left side in Fig. 6—of the conveyer chain comes opposite the chute 9.

In the device illustrated in Fig. 6 it has been assumed that inner boxes 7 from another inner box-making machine have previously been transferred to and secured in the spring holders 6 on the right-hand side of the conveyer chain 5. The yoke 26 is made of such size that these boxes can freely pass through the same. The conveyer chain 5 can also, if desired, have a slow continuous movement when the insertion of the boxes into its spring holders can be made so rapidly that the chain need not necessarily be stopped for this purpose.

In Figs. 8 and 9 a conveyer chain 28 is shown which is adapted to receive outer boxes as well as inner boxes. For this purpose the chain is provided on one side with straps 29 of the same kind as in the embodiment illustrated in Figs. 1 and 2, and on the other side with spring holders 30 of the same kind as in the embodiment illustrated in Figs. 3 to 5, inclusive. The outer boxes 31 are pushed on to the straps 29 directly from the piston of an outer box-making machine, whereas the inner boxes 32 may be inserted in the spring holders 30 by means of an apparatus of the same kind as that shown in Figs. 6 and 7.

The conveyer illustrated in Figs. 10 and 11, which is intended solely for receiving outer boxes, differs from the conveyers above described principally in that the chain is replaced by a comparatively broad belt 33 of leather, metal, or the like, transversely to which a number of flat arms 34, spring plates, straps, or the like are secured, on to which the outer boxes 35 are pushed from the pistons of two outer box-making machines. The arms 34, like the straps 2 in Figs. 1 and 2, should of course have such width that the outer boxes cannot turn around on the same.

Finally, Figs. 12 and 13 show a constructional form of the conveyer which is arranged in such manner that it can receive outer boxes as well as inner boxes. Said conveyer consists of a flexible belt 36 crosswise of which a number of chutes 37 of thin sheet metal or other suitable material are secured. Said chutes have such rectangular cross sectional shape that inner boxes as well as outer boxes may be pushed into the same from both ends, and that the boxes cannot afterwards turn in the chutes, but are compelled to retain their definite positions. Fig. 13 shows three inner boxes 38 placed upside down and pushed into the left chute 37. The outer boxes may be pushed into the chutes 37 directly from the piston of an outer box-making machine or machines, and the inner boxes may be pushed into the chutes from the chute 9 shown in Fig. 6. The chutes 37 are shaped in such manner as to form longitudinal supporting ribs for the boxes, with a view that the glued boxes shall not easily stick to the chutes and also to give the drying air a free access to the boxes.

In the machine aggregate diagrammatically illustrated in Figs. 14 to 16 inclusive, two endless conveyers are used, namely one conveyer for outer boxes, for instance a chain of the type shown in Figs. 1 and 2, and one conveyer for inner boxes, for instance a chain of the type shown in Figs. 3 to 5 inclusive. The conveyer chain 39 for the outer boxes conveys these boxes a number of times to and fro through a dryer 40, while the conveyer chain 41 for the inner boxes conveys these boxes a number of times to and fro through another dryer 42. In the drawings two outer box-making machines 43 and 44 are indicated, on the pistons 45 and 46, respectively, of which the outer boxes 47 are manufactured, after which they are pushed over on to the straps of the conveyer chain 39 in the manner above described. The inner boxes 48 are manufactured in two inner box-making machines 49 and 50 after which, by means of devices 51 and 52 of the type illustrated in Figs. 6 and 7, they are transferred to and secured in the spring holders of the conveyer chain 41. In the drawings there are also indicated two labelling machines 53 and 54 for providing the outer boxes with labels during the drying, before said boxes are supplied to the box-closing machine. This is for the reason that it is now often desired to provide the outer boxes with labels on both sides, namely the factory label and an advertisement. These labelling machines may be of a construction known per se and which does not form part of this invention, for which reason said machines will not be further described.

Obviously, the labelling may be effected after the inner and outer boxes have been pushed together, as has heretofore always been practised, but since it is a considerable advantage to allow the labels to dry while the boxes are still separate, the labelling is effected in this instance during the drying. In Figs. 15 and 16 a box-closing machine is also diagrammatically indicated at 55, and means 56 and 57 for transferring the outer boxes and the inner boxes, respectively, from the conveyer chains to said box-closing machine.

The two dryers 40 and 42 in which the boxes are dried by means of hot air, are placed above the said machines from considerations of space. In said dryers suitable guide rollers 58 are journalled over which the conveyer chains run several times to and fro through the dryer from above downwards, either in one and the same vertical plane, as assumed in Fig. 16, or in two or more parallel vertical planes, depending upon the space at disposal for the dryers, the chains running in the latter case from the first plane to the second and so forth in an oblique direction, and finally also in an oblique direction back from the last plane to the first. The labelling may then suitably be effected during the movement in the last plane, and the removal of the dry boxes and the introduction of new boxes may be effected during the way from the last plane to the first one.

When the outer boxes 47 have been pushed on to the straps of the conveyer chain 39, they are moved by said chain, in the direction of the arrows in Fig. 14, up into the dryer 40 and, in the instance illustrated, five times through said dryer in its longitudinal direction, after which they are assumed to be sufficiently dry in order to be labelled. The chain 39 now passes out from the dryer and in a loop down to the labelling machine 53, which provides the boxes with labels on one side. Afterwards the chain again runs up into the dryer 40 and twice through the same in its longitudinal direction, after which it passes down to the second labelling machine 54, which provides the boxes with labels on the other side. Afterwards the chain runs again up into the dryer 40 and through the same once, after which the boxes are assumed to be fully dried. The chain now leaves the dryer at 59 and passes down to the means 56 for transferring the outer boxes to the box-closing machine. At this point the boxes are pushed off from the straps of the conveyer chain, after which the chain returns to the two outer box-making machines 43 and 44 in order again to receive boxes from the pistons of said machines. During this entire movement the outer boxes are held by the straps of the conveyer chain and will thus retain their determined positions all the while.

The inner boxes 48 are conducted in a similar manner by the conveyer chain 41 several times to and fro, in one or more vertical planes, through the dryer 42, with the difference, however, that said conveyer chain does not run out to a labelling machine, since the inner boxes are not to be provided with labels.

When the boxes have been dried in this manner, the chain 41 leaves the dryer 42 and runs down to the means 57 for transferring the inner boxes to the box-closing machine, where the boxes are removed from the spring holders of the conveyor chain 41 in a manner described here below.

The devices above referred to and indicated in Figs. 15 and 16, for transferring the outer and inner boxes from the conveyor chains to the box-closing machine, may be constructed in several various ways, provided they are arranged in such manner that also during such transfer the boxes retain their definite positions. Also the box-closing machine proper may be constructed in various ways and may, for instance, be single, double, or multiple acting, that is to say, it may close one, two, or several pairs of boxes at a time, a pair of boxes comprising one inner and one outer box. The machine may be arranged substantially in a previously well-known manner, and may be provided with plungers which push the inner boxes into the outer boxes, and with resilient guides which project into the outer boxes and guide the inner boxes during the pushing-in movement. Suitable forms of these members and their principal manner of operation are known from old box-closing machines, and therefore, they need not be further described.

According to the embodiment illustrated in Fig. 17 to 19 inclusive, the apparatus for transferring the outer boxes 47 from the position in which they are stripped off from the straps 2 of the conveyer chain 39, to the box-closing machine consists of two endless chains or belts 60 and 61, to which are secured partitions 62 between which cells are formed so dimensioned that each cell can receive an outer box. These cell chains move one on each side of and parallelly to a portion of the chain 39, in such manner that by means of suitable stripping-off members 93, the outer boxes 47 can be pushed off from the straps 2 into the corresponding cells. The outer boxes are afterwards moved, while resting in said cells, to the box-closing machine, the cell chains 60 and 61 being caused to move step by step in a direction from above downwards as viewed in Fig. 17. The means for transferring the inner boxes 48 from the spring holders 6 of the conveyer chain 41 to the box-closing machine consist of a number of levers 64 pivotally mounted on the fixed shaft 63, and each of which supports two presser plates 65 which serve, upon the lever turning downwards, to press two inner boxes off the spring holders 6, one on each side of the conveyer chain 41, and also of a number of endless belt conveyers 66, the upper parts of which run in and form the bottoms of stationary guide chutes 67, and in this manner carry the inner boxes which have been released from the spring holders 6 and which thus fall down on the belt conveyers 66, to the box-closing machine.

Of the box-closing machine, only those members are illustrated which are associated with the cell chain 60, and of these only the principal members, namely guides 68, each of which is formed in the usual manner of four thin spring tongues, plungers 69 which serve to push the outer boxes 47 slightly in over said guides, and pushing-in plungers 70 which serve, when moving to the left in Fig. 17, to push the inner boxes 48 through the guides 68 into the outer boxes 47. In the instance illustrated, the pushing-in plungers 70 are slidably mounted alongside the associate guide chutes 67, and in view hereof there are provided, in front of the ends of said chutes, arms 71 which are movable in the transverse direction and which serve to push the inner boxes 48 discharged from the guide chutes a slight distance to the side, so that the boxes come right opposite the pushing-in plungers 70 and the guides 68. Afterwards the pushing-in plungers 70 move forwards, i. e. to the left in Fig. 17, and push the inner boxes 48 through the guides 68 into the outer boxes 47. The assembled boxes are then conveyed by the cell chains 60 and 61 to a position, not illustrated in the drawings, in which they are pushed out from the cells and are collected in suitable manner in order to be conveyed to the machines in which they are to be filled with matches.

Owing to a defect in the veneer or in the paper of which the boxes are made, or for other reasons, it sometimes happens that the operation of the box-making machine must be interrupted for a longer or shorter period of time. In such case no boxes will be transferred to those straps 2 or spring holders 6 of the conveyer chains 39 and 41, respectively, which in the meantime pass the box-making machine which has been stopped. In view hereof, and in order to obtain an as automatic and uninterrupted operation as possible of the box-closing machine, the mean production of the inner box-making machines must be controlled in accordance with that of the outer box-making machines, or vice versa, and further, the machine must be provided with control devices which control the supply of inner and outer boxes to the box-closing machine, so that the supply of the one kind of boxes always corresponds to the supply of the other kind. In the present case it is intended that the means production of the inner box-making machines shall correspond to or slightly exceed that of the outer box-making machines, and that the quantity of inner boxes possibly in excess shall automatically be removed, afterwards when suitable to be introduced by hand in the supply chutes 67 to the box-closing machine, and further, the machine is provided with control devices which stop the supply of inner boxes to the different box-closing positions in the box-closing machine, if there are no outer boxes in said positions.

This alternative has been chosen with regard to the fact that in view of their simpler construction the outer box-makng machines operate more reliably than the inner box-making machines. It will be understood, however, that the control devices illustrated in the drawings and described here below are equally applicable in principle if instead it be found suitable to control the supply of outer boxes to the box-closing positions in accordance with the presence of inner boxes in said positions. Finally, it is also possible automatically to supply either outer boxes alone or inner boxes alone to the box-closing machine, the boxes of the other kind—inner boxes or outer boxes, respectively—being arranged and supplied by hand, without impeding the applicability of the conveyer and control devices in question.

In the embodiment illustrated in Figs. 17 to 19, inclusive, there are provided feelers 72 about those cells in the cell chain 60 which occupy positions three cell widths in advance of the box-closing positions, it being assumed that the chain 60 is each time moved a distance equal to three cell widths. Said feelers are secured to slides 73 which are movable up and down in stationary guides 74, and are actuated by springs 75 which tend to move the slides and thus also the feelers 72 downwards.

Secured to the slides 73 are arms 76 which are adapted to cooperate with locking levers 78 pivoted on fixed pivots 77, and which in their turn are to cooperate with pins 79 on those arms 71 which, in the manner above described, push the inner boxes leaving the chutes 67 to the side, so that said boxes arrive opposite the pushing-in plungers 70 and the guides 68. The slides 73 are moved upwards by oscillating levers 80 and downwards by the springs 75. Now, it will be obvious that the downward movement of the feelers 72 produced by the springs 75 will be interrupted earlier if the feelers strike against outer boxes in the cells in question, whereas they will move farther down, as far as to the bottoms of the cells, if there are no outer boxes in the cells. In this latter case the arms 76 strike against the locking levers 78 and turn said levers in such manner that they come in the way of the pins 79 on the arms 71, so that upon the next stroke of the machine these latter will be prevented from movement and consequently cannot move any inner boxes from the supply chutes 67 over to the pushing-in positions in front of the plungers 70.

Simultaneously, the cell chain 60 has also been moved a distance equal to three cell widths downwards in Fig. 17, and consequently those cells which previously were below the feelers 72, have now arrived in front of the pushing-in plungers 70. When these plungers now move forward, there are thus no inner boxes in front of the plungers at the position or positions where there are no outer boxes in the corresponding cells.

When those transferring arms 71 the movement of which was not prevented because there were outer boxes in the corresponding cells, have completed their movement and returned to the positions shown in Fig. 17, the locking lever or levers 78 previously actuated shall be returned to the positions of rest shown in Fig. 18, in which they allow movement of the arms 71. This is effected upon the upward movement of the slides 73 by means of additional arms 81 attached to said slides.

The feelers 72 as well as the locking members 78 may, of course, be modified in a great many different ways without their function being changed.

If during an extended period of time no outer boxes are supplied to the box-closing positions, the supply chutes 67 will gradually become filled with inner boxes, so that they cannot receive any more. In such case the supply of inner boxes to the chutes 67 must therefore be interrupted, and this is effected in the embodiment illustrated in Figs. 17 to 19 by a number of feeler arms 82, one for each chute.

These arms are pivotally mounted on the same shaft 63 as the arms 64, so as to be capable of movement up and down. The downward movement of said arms towards the chutes 67 is stopped earlier if the arms strike against boxes in the chutes, whereas they will move down to the bottoms of the chutes if there are no inner boxes at the respective points of the chutes, that is to say, if the chutes are not filled, but are able to receive further boxes. Each arm 82 is provided with a pin 83 which is intended to cooperate with an angular pawl 85 which is pivoted on the stationary shaft 84 and is actuated by a spring, and which is adapted to catch below the outermost presser plate 65 on the associate arm 64 and thus to prevent said arm from moving downwards if the associate chute 67 is already filled with inner boxes.

If during their downward movement the feeler arms 82 do not strike against inner boxes in the chutes 67 and therefore are able to move all the way down, their pins 83 strike against the pawls 85 and turn the same in the clockwise direction in Fig. 19, so that the arms 64 are released and are allowed to move downwards in order in the manner above described to press inner boxes off the spring holders of the conveyer chain 41.

Again, if a feeler arm 82 moving downwards strikes against an inner box in the associate chute 67, its downward movement is stopped so early that its pin 83 does not actuate the associate pawl 85, whereby the associate arm 64 remains locked in the position shown in Fig. 19 and cannot press any inner boxes off the spring holders 6 of the conveyer chain. In this manner the supply of inner boxes to the associate chute is thus stopped. This course is repeated until the inner boxes in the chute in question have been partly consumed, after which the supply of boxes is again resumed.

The inner boxes which owing to the function of the control device above described are not pressed off the spring holders of the conveyer chain 41, are removed from the conveyer chain when it has moved past all chutes 67, and are collected, later to be placed by hand in the supply chutes 67 if for any reason any of the inner box-making machines which supply inner boxes to the chain 41, is put out of operation during a considerable period of time.

The feeler members may, of course, also be arranged and placed in such manner that instead of preventing the feeding of inner or outer boxes to the box-closing positions, said members actuate the plungers which push the inner boxes into the outer boxes, in such manner that said plungers are prevented from moving forward if there is a shortage of outer or inner boxes. In this case all of the pushing-in plungers should be spring-actuated in the direction of their forward movement, so that a plunger stopped by the feeler member can remain stationary while the other plungers perform their pushing-in movement.

Fig. 20 shows a modified embodiment of a control device for automatic control of the supply of inner boxes 48 to the cells of an inner box cell chain in accordance with the presence of outer boxes 47 in the corresponding cells of the outer box cell chain. In this modified construction, which is designed to operate with electric current supplied by a battery 175, 176 denotes the outer box cell chain, 177 one of the resilient pushing-in guides, 178 the inner box cell chain, and 179 one of the supply chutes in which a belt conveyer 180 is movable, the upper part of which runs in the direction of the arrow and tends to push the inner boxes 48 forward to the cell chain 178. At the left end of the supply chute 179 there is provided a resilient stop 106 which makes sufficient resistance to the inner boxes in order to prevent the same from leaving the chute owing to the feeding action of the movable belt conveyer 180. The transfer of the inner boxes from the chute 179 to the cells of the chain 178 is in this case effected by means of a feed hook 181 which is pivotally mounted on a pin 182 on a lever 183, which in its turn is pivotally mounted on the stationary shaft 184 and performs an oscillating movement. The feed hook 181 is adapted to engage the foremost inner box 48 in the chute 179, and, upon the lever 183 moving to the left, it overcomes the resistance of the resilient stop and pushes the foremost box into the opposite cell of the chain 178.

The feeler member consists of an arm 185 which is pivotally mounted on the shaft 186, and which is caused to perform a vertically oscillating movement by an oscillating yoke 187. When the arm swings downwards, its outer bent-down end moves down into the cell of the chain 176 below said end, in order to ascertain whether or not there is an outer box in said cell. If the arm does not light on an outer box in said cell, it is turned further downwards by its own weight, and a contact pin 188 secured to said arm dips into a mercury cup 189 or similar contact device, and closes a current from the battery 175 through an electromagnet 190 which is mounted on the lever 183, and which serves to actuate the above-mentioned feed hook 181. When the current flows through the electromagnet, the feed hook is attracted, so that it cannot engage the inner box, and therefore cannot push said box into the cell chain 178. Again, if the arm 185 lights on an outer box 47 in the cell chain 176, the current is not closed at the contact 188, and the feed hook 181 will not be attracted by the electromagnet, and upon the lever 183 moving towards the left it will thus push the foremost inner box 48 into the chain 178.

Figs. 21 and 22 show diagrammatically two conveyers for moving the boxes through the dryers one 210 of which conveyers is intended for inner boxes and the other 211 for outer boxes, as well as two associate box-making machines, a box-closing machine, and a labelling machine, of a substantially well-known type. Each conveyer consists of two endless chains 200 which run over chain sprocket wheels 201 on shafts 202 which extend through the drying chamber 203. Secured transversely to the chains 200 are long chutes 206, which have such cross sectional shape and are so placed relatively to one another that inner boxes as well as outer boxes may be pushed into the same, and that afterwards the boxes cannot turn or twist in the chutes, but are compelled to retain their determined positions.

From the piston 213 of the outer box-making machine 212 the completed outer boxes 214 are pushed directly into the chutes 206 of the conveyer 211, while the inner boxes 217 manufactured on the piston 216 of the inner box-making machine 215 are pushed through a stationary chute 218 into the chutes 206 of the conveyer 210. The two conveyers 210 and 211 may suitably be driven in such manner that the box chutes 206 of the same obtain a continuous or step-by-step movement, and move past the box-making machines in such manner that one chute passes the associate box-making machine for each box completed in the same, so that, when one box has been pushed into a certain chute 206, the next box will be pushed into the next chute 206, and so on, but they may also be driven in such manner that a new chute is moved in front of the associate box-making machine only after the preceding chute has been completely filled with boxes. In the embodiment illustrated in Figs. 21 and 22 the movement of the two conveyers is intended to take place according to the firstnamed alternative.

When the boxes have been dried, they are pushed out of the chutes 206 at their opposite ends by arms 219 and 220, which move all the boxes in each chute, to the right in Fig. 21, a distance corresponding to the length of a box, with the result that the outermost box in each chute is pushed out.

The dried outer boxes 214 pushed out from the chutes 206 of the conveyer 211 in this manner, are received in a stationary chute 221 in which the upper part of an endless belt conveyer 222 runs, which feeds the boxes to the box-closing machine. The inner boxes 217 which are pushed out from the chute 206 of the conveyer 210, are received in a similar manner in a stationary chute 223 in which the upper part of an endless belt conveyer 224 runs, which feeds the inner boxes to the box-closing machine. Of this machine, which may be of any well-known type, only the principal parts are illustrated, namely the resilient guide 225, a plunger 226 which serves to push the outer boxes slightly in over said guide, the pushing-in plunger 227 which, upon movement in the direction towards the right in Fig. 21, pushes the inner boxes through the guide 225 into the outer boxes, a plunger 228 which pushes the outer boxes 214 from the chute 221 to the pushing-in position opposite the guide 225, and a plunger 229 which pushes the inner boxes 217 from the chute 223 to the box-closing position in front of the guide 225. The closed boxes are then pushed by the plunger 228 through the stationary chute 230 to the labelling machine of which only the paste container 231 and the label magazine 232 are indicated in the drawings.

Also in this embodiment there are provided means for automatic control of the supply of outer and inner boxes to the box-closing machine. In this case said control means are constructed in such manner that the box-closing machine is provided with a stopping and starting device, which automatically stops the machine if for some reason the supply of boxes runs short in either of the two supply chutes 221 and 223, but which restarts the machine as soon as boxes are again present in the portions of the two chutes nearest to the box-closing machine. The box-closing machine is driven by the shaft 233 which in its turn is driven by the shaft 234, which drives the two box-making machines and the conveyers 210 and 211, by the intermediary of a clutch 235, 236 the one portion 236 of which is normally held by a spring 237 in engagement with the clutch member 235 on the driving shaft 234, and is slidable on the shaft 233 for the purpose of disconnecting the clutch and stopping the box-closing machine. The slidable clutch member 236 is provided with a cam groove 238, above which a stop pin 240 is mounted in suitable stationary guides 239. Said pin is normally held raised up from the cam groove in the slidable clutch member 236 by the magnet core 241 of an electromagnet 242, said magnet core being normally maintained by a spring, not illustrated, in engagement with a notch in the stop pin 240, thereby holding said pin in raised position.

The electromagnet 242 is connected in the circuit of a battery 243, which circuit is branched into two parallel circuits including two feeler members in the shape of light sliding contact springs 244 and 245, which bear against the boxes fed forwards in the two chutes 221 and 223, and two contacts 246 and 247, respectively, cooperating with the said springs. In the embodiment illustrated, the spring 244 is adapted to bear against the upper side of the outer boxes in the chute 221, and the spring 245 is adapted to bear against the sides of the inner boxes in the chute 223, but it is of course also possible to arrange said springs in other manner, for instance so that they bear against the bottoms of the boxes.

If for some reason the supply of outer boxes 214 in the chute 221 runs out, the spring 244 will come in contact with the contact 246, and if the supply of inner boxes 217 in the chute 223 runs out, the spring 245 comes in contact with the contact 247. In both cases a current is closed through the electromagnet 242 which will then attract its core 241, which will release the stop pin 240. This pin moves down under the influence of its own weight and engages the cam groove 238 in the slidable clutch member 236. As a result hereof said clutch member will be moved, while compressing the spring 237, to the right in Fig. 21, so that the clutch becomes disconnected and the box-closing machine stops.

As soon as there are again boxes in the portions of the chutes 221 and 223 nearest to the box-closing machine, said machine shall be automatically re-started. This is effected by means of a bell crank lever 248 which is pivoted on the stationary pivot 249 and is actuated by a spring 250 and by a cam disk 251 secured to the shaft 234, and one arm of which lever catches under the head of the stop pin 240. This bell crank lever will thus tend to lift the stop pin 240 up from the cam groove 238 once for each revolution of the cam disk 251, but is prevented therefrom as long as current flows through the electromagnet 242, by the rear end of the magnet core 241 projecting over a tongue 252 on the bell crank lever, thus locking said lever. As soon as the current through the electromagnet 242 is again interrupted, however, owing to boxes having again arrived in the portions of the chutes 221 and 223 nearest the box-closing machine, and having moved the springs 244 and 245 aside, the magnet core 241 is again moved by the spring actuating the same towards the stop pin 240 and releases the lever 248, which will then raise the stop pin 240 up from the cam groove 238, so that the spring 237 throws in the clutch, and the box-closing machine is restarted. The stop pin is afterwards maintained in its raised position by the magnet core, as long as there are boxes in both chutes 221 and 223.

If any of the chutes 221 and 223 becomes completely filled with boxes, the boxes pushed out of the chutes of the associate conveyer 211 or 210 are thrown out to one side by an ejector arm 253 or 254, respectively. These arms are driven by the shaft 234 in such manner that they always oscillate on their shafts 255 and 256, respectively. As long as the chutes 221 and 223 are not filled with boxes, however, the boxes pushed out are moved away by the belt conveyers in said chutes so rapidly that the boxes will not be hit by the ejector arms.

Figs. 23 and 24 show a modified, purely mechanical constructional form of the last described control device for stopping the box-closing machine, should for some reason the supply of outer or inner boxes to the same cease. Also in this case the outer boxes 214 and the inner boxes 217 are supplied to the box-closing machine by means of endless belt conveyers 260 and 261, the upper parts of which run in stationary chutes 262 and 263, respectively. The box-closing machine is driven by the shaft 264, which in its turn is driven by the shaft 265 through the intermediary of a clutch 266, 267, one member of which may be displaced—in the same manner as in the embodiment just described—for the purpose of disconnecting the clutch, by a stop pin 268 which is slidably mounted in a fixed guide 269, and is normally held in raised position by a catch 270 which engages a notch 271 at the lower end of the stop pin.

In this embodiment the feeler members consist of tongues 272 and 273 mounted at the upper ends of two arms 276 and 277, respectively, which are pivotally mounted on the shafts 274 and 275, respectively, and which are caused to perform oscillating movements by springs 278 and 279 and cam disks secured to the shaft 265, in such manner that the tongues 272 and 273 are swung in towards the boxes moving in the chutes 262 and 263. If boxes are present in the chutes opposite said tongues, the inward movement of the latter will be stopped so early that the clutch is not actuated. On the other hand, if for some reason the outer boxes 214 in the chute 262 are so nearly consumed that there are only two boxes left, the tongue 272 will be swung farther in over the chute 262 to the left in Fig. 23, owing to which a tongue 280 on the arm 276 strikes against the catch 270 and turns it aside, so that the stop pin 268 is released and falls down, disconnecting the clutch so that the box-closing machine is stopped. Again, if the inner boxes 217 in the chute 263 are so nearly consumed that there are only two boxes left, the tongue 273 will be swung farther in over the chute 263 to the right in Fig. 23, so that a pin 282 secured to a tongue 281 on the arm 277 will strike against the rear extension of the catch 270 and turns it aside with the same result, namely that the box-closing machine is stopped.

As soon as there are boxes again in the two chutes 262 and 263 opposite the feeler tongues 272 and 273, however, the box-closing machine shall be automatically re-started. This is effected, also in this case, by a bell crank lever 283 which is rotatable on the fixed pivot 284 and is actuated by a spring 285 and by a cam disk 286 mounted on the shaft 265, so that said lever is caused to perform an oscillating movement. The outer forked end of one arm of said lever engages the under side of the head of the stop pin 268. When the lever 283 actuated by the spring 285 tends to move upwards and raise the stop pin 268 up from the cam groove of the slidable clutch member, it can do so if the feeler members 272 and 273 each have hit one box, so that their inward movements have been checked in the positions shown in Fig. 23. The stop pin will then be raised, so that the catch 270 can again engage the notch 271. On the other hand, as long as one of the tongues 272 or 273 does not bear against a box in the associate chute, the bell crank lever 283 cannot raise the stop pin, since a second tongue 287 on the arm 276, or the tongue 281 on the arm 277, has then been swung so far inwards that it projects over projections 288 or 289, respectively, on the bell crank lever 283 and thus prevents this latter from raising the stop pin.

Finally, Figs. 25 to 27, inclusive, show a further constructional form of the conveyer for moving the boxes through the dryer. According to this construction the conveyer consists of a plurality of frames or bottoms 305, to which walls 306 are secured in such manner that they form cells for receiving the boxes.

The cells shall, of course, be so shaped and dimensioned that the boxes cannot turn or twist in the same. The cell frames formed in this manner are caused to move in a closed path, for instance rectangular, of the shape shown in Fig. 25, by suitable feed devices or by hand. The frames first pass a filling position 307 in which the cells are filled with boxes from the box-making machines placed at the side of the path, and then through the dryer and finally to an emptying position 308 in which the dried boxes are pushed out of the cells in order to be conveyed to the box-closing machine, for instance by means of conveyer belts running in chutes.

The embodiments above described and illustrated in the drawings are only to be regarded as examples, and it will be understood that the details of the same may be further modified in several ways without departing from the principle of the invention. This applies especially to the members which guide the boxes during the transport from the box-making machines to the box-closing machines. In practice said members may be constructed in any suitable manner, provided they are so arranged that the boxes are not brought out of their predetermined positions. Of course, this also applies to the members which transmit the necessary movements to the said holding members.

Furthermore, the control and feeler members which control the supply of boxes of both kinds to the box-closing machine, may also in practice be constructed in many different ways.

We claim:

1. In combination, a machine for making wooden veneer match box portions, a dryer, a box-closing machine, and a conveyer adapted to convey the box portions from the box-making machine through the dryer to the box-closing machine while maintaining the box portions in predetermined arrangement during such conveyance.

2. In combination, a machine for making wooden veneer match box portions, a dryer, a box-closing machine, a conveyer adapted to convey the box portions from the box-making machine through the dryer to the box-closing machine, and means on said conveyer maintaining the box portions in predetermined arrangement during such conveyance.

3. In combination, a machine for making wooden veneer match box portions, a dryer, a box-closing machine, a conveyer consisting of a chain adapted to convey the box portions from the box-making machine through the dryer to the box-closing machine, means on said chain maintaining the box portions in predetermined arrangement during such conveyance, and guide rollers for said chain.

4. In combination, a machine for making wooden veneer match box portions, a dryer, a box-closing machine, a conveyer consisting of a link chain adapted to convey the box portions from the box-making machine through the dryer to the box-closing machine, said link chain having roller pins provided with central through holes, and means inserted and secured in said holes in said chains and serving to maintain the box portions in predetermined arrangement during such conveyance, and guide rollers for said chain.

5. In combination, a machine for making wooden veneer match box portions, a dryer, a box-closing machine, a conveyer consisting of a chain adapted to convey the box portions from the box-making machine through the dryer to the box-closing machine, and means on said chain maintaining the box portions in predetermined arrangement during such conveyance, said means consisting of arms secured to the chain and having a width slightly less than the inside width but greater than the inside height of the outer box portions.

6. In combination, a machine for making wooden veneer match box portions, a dryer, a box-closing machine, a conveyer consisting of a chain adapted to convey the box portions from the box-making machine through the dryer to the box-closing machine, and means on said chain maintaining the box portions in predetermined arrangement during such conveyance, said means consisting of spring holders adapted to grip around a side of a box portion.

7. In combination, a machine for making wooden veneer match box portions, a dryer, a box-closing machine, a conveyer consisting of a chain adapted to convey the box portions from the box-making machine through the dryer to the box-closing machine, means on said chain maintaining the box portions in predetermined arrangement during such conveyance, and guide rollers for said chain in said dryer, said guide rollers being placed in such manner that said conveyer chain is caused to move through said dryer in the principal direction from above downwards.

8. In combination, a machine for making wooden veneer match box portions, a dryer, a labelling machine, a box-closing machine, a conveyer consisting of a chain adapted to convey the box portions from the box-making machine through the dryer and through the labelling machine to the box-closing machine, means on said chain maintaining the box portions in predetermined arrangement during such conveyance, and guide rollers for said chain, said guide rollers being placed in such manner that said conveyer chain first runs through said dryer and then through said labelling machine and afterwards again through said dryer.

9. In combination, a machine for making wooden veneer match box portions, a dryer, a box-closing machine, a conveyer adapted to convey the box portions from the box-making machine through the dryer to the box-closing machine, means on said conveyer maintaining the box portions in predetermined arrangement during such conveyance, and means for removing the box portions from said maintaining means.

10. In combination, a machine for making wooden veneer match box portions, a dryer, a box-closing machine, a conveyer adapted to convey the box portions from the box-making machine through the dryer to the box-closing machine, means on said conveyer maintaining the box portions in predetermined arrangement during such conveyance, and control devices associated with said conveyer and adapted to automatically control the supply of the one kind of box portions in accordance with the supply of the other kind of box portions to the box-closing machine.

11. In combination, a machine for making wooden veneer match box portions, a dryer, a box-closing machine, a conveyer adapted to convey the box portions from the box-making machine through the dryer to the box-closing machine, means on said conveyer maintaining the box portions in predetermined arrangement during such conveyance, said box-closing machine having box-closing positions, and control devices associated with said conveyer and adapted to automatically control the supply of the one kind of box portions to said box-closing positions in accordance with the supply of box portions of the other kind to said box-closing positions.

12. In combination, a machine for making wooden veneer match box portions, a dryer, a box-closing machine, a conveyer adapted to convey the box portions from the box-making machine through the dryer to the box-closing machine, means on said conveyer maintaining the box portions in predetermined arrangement during such conveyance, said box-closing machine having box-closing positions, and control devices associated with said conveyer and adapted to automatically stop the supply of the one kind of box portions to such of said box-closing positions as are not occupied by box portions of the other kind and to automatically restart the supply of box portions to such box-closing positions as soon as the latter are again supplied with box portions of the other kind.

13. In combination, a machine for making wooden veneer match box portions, a dryer, a box-closing machine, a conveyer adapted to convey one kind of box portions from the box-making machine through the dryer to the box-closing machine, means on said conveyer maintaining the box portions in predetermined arrangement during such conveyance, said box-closing machine having box-closing positions, means supplying box portions of the other kind to said box-closing positions, and control devices associated with said conveyer and adapted to automatically control the supply of the second kind of box portions from said supply means to said box-closing positions in accordance with the supply of box portions of the first kind from said conveyer to said box-closing positions, said control devices comprising feelers adapted to be actuated by the first kind of boxes supplied from said conveyer to the box-closing positions, and members connected to said feelers and controlling the supply of the second kind of box portions from said supply means.

14. In combination, a machine for making wooden veneer match box portions, a dryer, a box-closing machine, a conveyer adapted to convey the box portions from the box-making machine through the dryer to the box-closing machine, means on said conveyer maintaining the box portions in predetermined arrangement during such conveyance, a portion of said conveyer adjacent said box-closing machine being arranged as a collecting receptacle for the box portions, and control devices associated with said receptacle and adapted to automatically control the supply of the one kind of box portions from said receptacle in accordance with the supply of the other kind of box portions to the box-closing machine.

15. In combination, a machine for making wooden veneer match box portions, a dryer, a box-closing machine, a conveyer adapted to convey the box portions from the box-making machine through the dryer to the box-closing machine, means on said conveyer maintaining the box portions in predetermined arrangement during such conveyance, a portion of said conveyer adjacent said box-closing machine being arranged as a collecting receptacle for the box portions, means transferring the box portions from said conveyer to said receptacle, control devices controlling said transferring means to stop operation of the same when said receptacle is filled with box portions, and control devices associated with said receptacle and adapted to automatically control the supply of the one kind of box portions from said receptacle in accordance with the supply of the other kind of box portions to the box-closing machine.

16. In combination, a machine for making wooden veneer match box portions, a dryer, a labelling machine, a box-closing machine, a conveyer adapted to convey the box portions from the box-making machine through the dryer and through the labelling machine to the box-closing machine while maintaining the box portions in predetermined arrangement during such conveyance, and guide means for said conveyer, said guide means being situated in such manner that said conveyer first runs through said dryer and then through said labelling machine and afterwards again through said dryer.

17. In combination, a machine for making wooden veneer match box portions, a dryer, a box-closing machine, a conveyer adapted to convey the box portions from the box-making machine through the dryer to the box-closing machine while maintaining the box portions in predetermined arrangement during such conveyance, and means for transferring the box portions in predetermined arrangement from the box-making machine to the conveyer.

GUNNAR EMANUEL MELLGREN.
JOHN GOTTHARD SJÖSTRÖM.
ANDERS ROLAND SWÄLAS.
GUSTAF VILHELM HEDIN.